(12) United States Patent  
Fuji

(10) Patent No.: US 8,078,778 B2  
(45) Date of Patent: Dec. 13, 2011

(54) IMAGE PROCESSING APPARATUS FOR READING COMPRESSED DATA FROM AND WRITING TO MEMORY VIA DATA BUS AND IMAGE PROCESSING METHOD

(75) Inventor: Kazuhiro Fuji, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 346 days.

(21) Appl. No.: 12/081,091

(22) Filed: Apr. 10, 2008

(65) Prior Publication Data

US 2008/0294816 A1    Nov. 27, 2008

(30) Foreign Application Priority Data

May 22, 2007   (JP) ................................ 2007-135178

(51) Int. Cl.
*G06F 13/00* (2006.01)
*G06F 15/16* (2006.01)

(52) U.S. Cl. .......................................... 710/68; 709/247

(58) Field of Classification Search ........................ None
See application file for complete search history.

(56) References Cited

U.S. PATENT DOCUMENTS

| | | | | |
|---|---|---|---|---|
| 5,729,668 A | * | 3/1998 | Claflin et al. | ................ 358/1.15 |
| 6,601,104 B1 | * | 7/2003 | Fallon | ............................ 709/231 |
| 6,941,428 B2 | * | 9/2005 | Carr | ............................... 711/158 |
| 7,403,183 B2 | * | 7/2008 | Someya | ........................... 345/98 |
| 7,440,629 B2 | | 10/2008 | Kitamura | |
| 2005/0134907 A1 | * | 6/2005 | Obuchi et al. | ................. 358/1.15 |
| 2008/0228998 A1 | * | 9/2008 | Colecchia et al. | ............. 711/103 |

FOREIGN PATENT DOCUMENTS

| | | |
|---|---|---|
| JP | 10-224532 | 8/1998 |
| JP | 2001-265298 | 9/2001 |
| JP | 2005-311743 | 11/2005 |
| JP | 2006-108836 | 4/2006 |

(Continued)

OTHER PUBLICATIONS

Ching-Yung Lin; Shih-Fu Chang; , "A robust image authentication method distinguishing JPEG compression from malicious manipulation," Circuits and Systems for Video Technology, IEEE Transactions on , vol. 11, No. 2, pp. 153-168, Feb. 2001 doi: 10.1109/76.905982 URL: http://ieeexplore.ieee.org/stamp/stamp.jsp?tp=&arnumber=905982&isnumber=19596.*

(Continued)

*Primary Examiner* — Tariq Hafiz
*Assistant Examiner* — Dayton Lewis-Taylor
(74) *Attorney, Agent, or Firm* — McGinn Intellectual Property Law Group, PLLC

(57) ABSTRACT

An image processing apparatus includes a data bus provided to access a memory, a compressing unit which compresses an image data and outputs a compressed image data, a write unit which writes the compressed image data into the memory via the data bus, a read unit which reads a compressed image from the memory via the data bus, a decompression unit which decompresses the compressed data read by the read unit, and a control unit which controls operations of the write unit and the read unit, based on an amount per unit time of the compressed image data outputted from the compressing unit, an amount per unit time of the compressed image data read from the memory and a degree of congestion of the data bus.

11 Claims, 5 Drawing Sheets

FOREIGN PATENT DOCUMENTS

| | | |
|---|---|---|
| JP | 2006-267172 | 10/2006 |
| KR | 2005-0062454 | 6/2005 |

OTHER PUBLICATIONS

Ozcelik, T.; Brailean, J.C.; Katsaggelos, A.K.; , "Image and video compression algorithms based on recovery techniques using mean field annealing," Proceedings of the IEEE , vol. 83, No. 2, pp. 304-316, Feb. 1995 doi: 10.1109/5.364460 URL: http://ieeexplore.ieee.org/stamp/stamp.jsp?tp=&arnumber=364460&isnumber=8350.*

Salembier, P.; Pardas, M.; , "Hierarchical morphological segmentation for image sequence coding ," Image Processing, IEEE Transactions on , vol. 3, No. 5, pp. 639-651, Sep. 1994 doi: 10.1109/83.334980 URL: http://ieeexplore.ieee.org/stamp/stamp.jsp?tp=&arnumber=334980&isnumber=7881.*

Korean Office Action dated Oct. 7, 2009 and partial English translation.

* cited by examiner

IMAGE PROCESSING APPARATUS FOR READING COMPRESSED DATA FROM AND WRITING TO MEMORY VIA DATA BUS AND IMAGE PROCESSING METHOD

BACKGROUND OF THE INVENTION

1. Field of the Invention

This invention relates to an image processing art, specifically to the control for compressing the current frame image and storing the compressed data in a shared memory and for reading and decompressing the compressed data of the adjacent frame image stored in the shared memory.

2. Description of Related Art

A variety of methods are proposed to decrease the use of memory and to prevent the posterior processing unit from overflowing at the time of compressing and decompressing image data.

For example, Patent Document 1 discloses the art of compressing image data according to the compression conversion rule corresponding to image data luminance information as a technology of reducing the use of memory and storing the compressed data and the compression conversion rule in the memory. At the time of decompression, the compressed data and the compression conversion rule are read from the memory, and the compressed data are decompressed according to the compression conversion rule. Patent Document 2 discloses, at the time of codifying image data and outputting the same to the processing unit of the subsequent stage (referred to as "VBV buffer" in Patent Document 2) through the transmission buffer memory, the art of monitoring the bit rate outputted from the transmission buffer memory, and controlling the data outputted by the transmission buffer memory when this bit rate has exceeded a predetermined value to reduce the output bit rate for preventing the overflow of the VBV buffer.

In an apparatus for handling the compression and decompression of image data, while the frame images successively inputted (referred hereinafter simply as "frame") are compressed, the compressed data are stored in the shared memory, and the compressed data of the adjacent frame stored in the shared memory are read out and are decompressed constituting a frame transfer processing operation.

For example, in the liquid crystal display, an overdrive processing operation applying an overvoltage rather than a voltage that reaches the target voltage when a response has been completed due to the slow response of liquid crystal is known, and for this overdrive processing operation, the frame transfer processing operation described above is used (see Patent Document 3).

The overdrive processing operation is described below with reference to FIG. 7. FIG. 7 shows an image display apparatus 1. The image display apparatus 1 includes an image display unit 10 for performing an overdrive processing operation on frames successively inputted and a liquid crystal display unit 20 such as a liquid crystal display panel for displaying images corresponding to the frames processed by the image processing unit 10. The image processing unit 10 includes a compression unit 11, a shared memory 12, a decompression unit 13, and a compensation unit 14. The compression unit 11 compresses the current frames and store them in the shared memory 12, and the decompression unit 13 reads the adjacent compressed frame from the shared memory 12 and decompress the same to obtain the adjacent decompressed frame. The compensation unit 14 generates an amount of overdrive in the direction of changing from the data of the adjacent decompressed frame to the current frame data, and compensates the current frame data by this amount of overdrive and output the same to the liquid crystal display unit 20.

Such an image processing apparatus includes normally not only a processing unit charged with compression processing and decompression processing but also another processing unit for accessing the shared memory. In a SoC (System-on-a-Chip) in which a plurality of processing units use the shared memory and the like, it is important to manage the bandwidth of the memory bus for accessing the shared memory. This is because, if a processing unit uses excessively the memory bus bandwidth, there develops a problem of memory bus breakdown in that other units will be unable to process.

Patent Document 4 discloses the art of restricting the capacity of the shared memory and preventing the deterioration of image quality in an image display apparatus having an overdrive function. This art divides the object frame in a plurality of blocks at the time of compression, and compresses each block by adjusting the compression ratio so that the data amount will be such that corresponds to the amount of memory used that has been predetermined for this block, and the compressed data of each block and the accuracy information showing the compression ratio for the block (referred to as "OD accuracy information" in patent documents) are stored in the shared memory. At the time of decompression, the compressed data and the OD accuracy information of each block of the object frame are read from the shared memory, and based on the OD accuracy information read out, the compressed data of each block of the object frame are decompressed to obtain the decompressed frame. At the time of generating the overdrive quantity for the current frame, the overdrive quantity for pixels in the corresponding block is generated according to the OD accuracy information of each block of the decompressed frame of the adjacent frame.

Patent Document 5 calculates the transfer quantity data of transferring common bus from the operational bus information in the processing mode for each processing in the system in which a plurality of modules of the image coder/decoder unit transfer data by using the shared bus, and changes the coding parameters of the image coder/decoder unit according to the quantity of transferred data.

[Patent Document 1] Japanese Patent Laid Open Application No. 2005-311743

[Patent Document 2] Japanese Patent Laid Open Application No. 2006-180036

[Patent Document 3] Japanese Patent Laid Open Application No. 2001-265298

[Patent Document 4] Japanese Patent Laid Open Application No. 2006-267172

[Patent Document 5] Japanese Patent Laid Open Application No. Hei 10(1998)-224532

The art disclosed in Patent Document 4 has a problem in that it can reduce the memory used by the compression processing unit and consequently the memory bus bandwidth by raising the compression ratio but that the image quality deteriorates when the compression ratio is reduced. There is a compression algorithm with variable amount of compressed data even with the same compression ratio, for example reversible compression, and in the case of compression with such a compression algorithm, it is necessary to allocate the amount of memory used to each block by assuming in advance the maximum amount of compressed data, and therefore waste can result. If an overdrive quantity is generated according to the OD accuracy information showing the compression ratio of each block, then only variation in the image quality caused by the compression of a plurality of blocks within the same frame with different compression ratios can be dissolved, and the deterioration of image quality caused by a high compression ratio cannot be dissolved.

The art of Patent Document 5 which consists in changing coding parameters of image data in order to prevent the breakup of the shared bus is like Patent Document 4 plagued by the problem of deterioration of image quality caused by changes in coding parameters. This art essentially calculates the bus bandwidth used by various processing units depending on the processing mode, and based on the result of that calculation allocates a predetermined bus bandwidth to the image coder/decoder unit. For example, even when other processing units use less bus bandwidth than calculated, the bus bandwidth opened by the image coder/decoder unit cannot be used, and as a result efficiency is low.

SUMMARY OF THE INVENTION

An image processing unit of an exemplary aspect of the invention includes a shared memory, a memory bus for accessing the shared memory, a frame transfer unit and a memory bus monitoring unit, and a control unit.

The frame transfer unit includes a compression unit for compressing the current frame image of the frame images successively inputted and writing the compressed data in the shared memory through a memory bus, and a decompression unit for reading the compressed data of the frame image of the adjacent the current frame image written by said compression unit from the shared memory through the memory bus and decompressing the same to obtain the decompressed image of the adjacent decompressed image.

The memory bus monitoring unit monitors the degree of congestion of the memory bus, and the bandwidth calculation unit calculates the memory bus bandwidth used by said frame transfer unit as a result of the processing of the frame transfer unit to obtain the calculated bandwidth.

The control unit controls whether the access of the frame transfer unit to the shared memory should be stopped or not based on the bandwidth calculated by the bandwidth calculation unit and the result of monitoring of the memory bus monitoring unit.

Incidentally, any method or system expressed in place of the image processing unit of the mode of carrying out described above is valid as a mode of carrying out this invention.

According to the art related with this invention, it is possible to prevent the breakdown of memory bus bandwidth and prevent the deterioration of the image quality while the current frame image is compressed and the compressed data is stored in the shared memory, and compressed data of the adjacent frame image stored in the shared memory is read out and decompressed.

BRIEF DESCRIPTION OF THE DRAWINGS

The above and other exemplary aspects, advantages and features of the present invention will be more apparent from the following description of certain exemplary embodiments taken in conjunction with the accompanying drawings, in which.

DETAILED DESCRIPTION OF THE EXEMPLARY EMBODIMENTS

Figure 1:
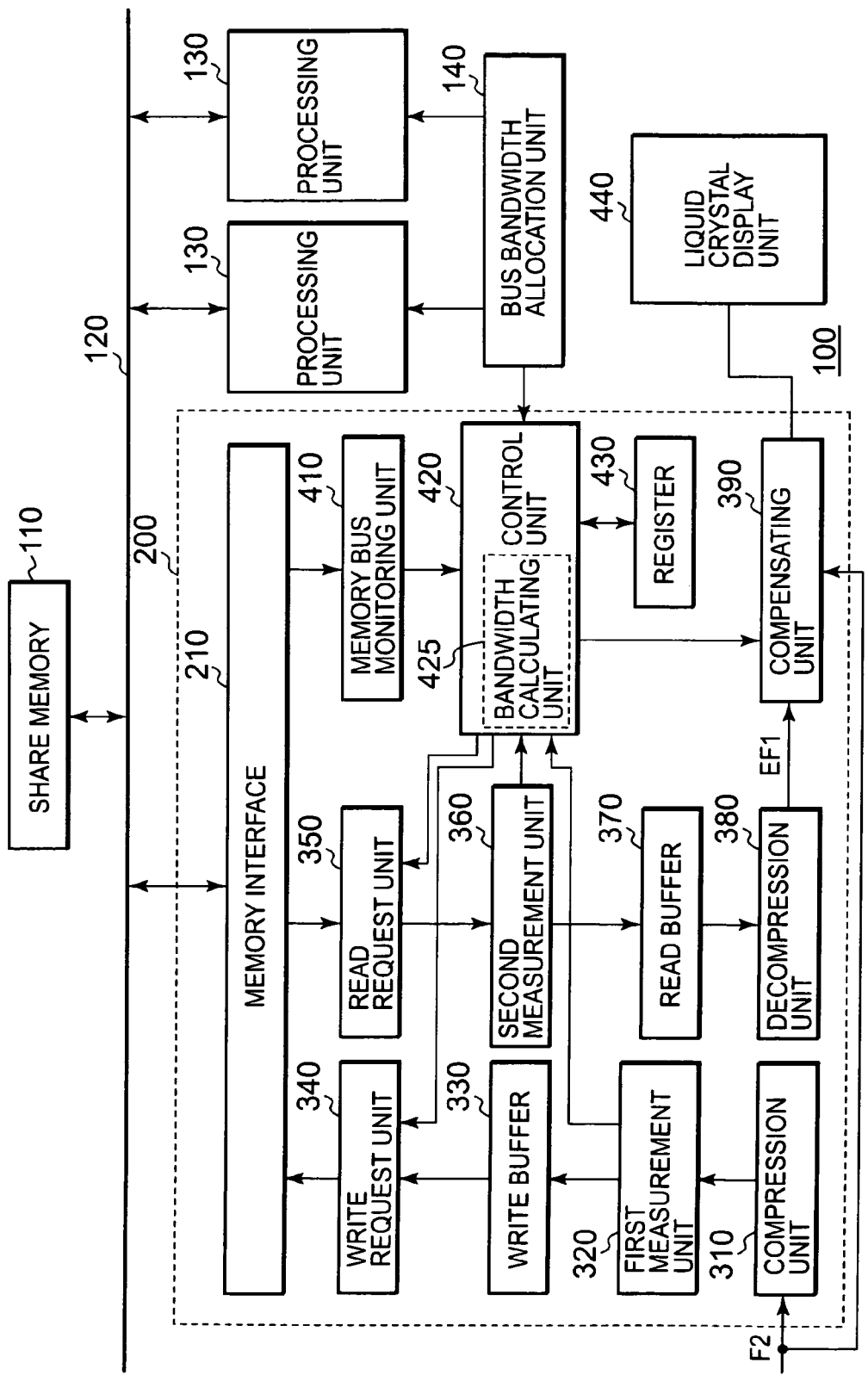
FIG. 1 is a block diagram showing a configuration of an image processing apparatus related to a mode of carrying out an exemplary aspect of the present invention.

FIG. 1 shows an image processing apparatus 100 related to the mode of carrying out this invention. The image processing apparatus 100 includes a shared memory 110, a memory bus 120, a plurality of processing units 130, a bus bandwidth allocation unit 140, an overdrive processing unit 200, and a liquid crystal display unit 440.

The overdrive processing unit 200 and the processing unit 130 access the shared memory 110 through the memory bus 120.

The bus bandwidth allocation unit 140 allocates respectively, for example at the time of initializing the image processing apparatus 100, a predetermined amount of the bandwidth of the memory bus 120 used by a plurality of processing units 130 and the overdrive processing unit 200. As long as the plurality of processing units 130 and the overdrive processing unit 200 access the shared memory 110 within the limit of the memory bus bandwidth allocated to themselves, the respective bandwidth is determined in such a way that no breakdown of the memory bus 120 such as overflow may occur.

The overdrive processing unit 200 generates image data to be outputted to the liquid crystal display unit 440 from the image data it had received. The processing unit 130 carries out different processing from the overdrive processing unit 200.

In the overdrive processing unit 200, the memory interface (referred hereinafter simply as "memory I/F") 210, the compression unit 310, the write buffer 330, the write request unit 340, the read buffer 370, and the decompression unit 380 function as the frame transfer unit, the compression unit 310, the write buffer 330, the write request unit 340 corresponds to what is referred to as "decompression unit" in the scope of claims. The compression unit compresses the current frame (shown by F2 in FIG. 1) for the image data successively inputted for each frame and writes the compressed data in the shared memory 110. The decompression unit reads the compressed data of the frame (F1 not shown) adjacent (previous) to the current frame F2 from the shared memory 110 and decompresses the same to obtain the decompressed frame (shown by EF1 in FIG. 1) adjacent to the frame F1.

The compression unit 310 compresses the frame F2 and outputs the compressed data to the write buffer 330. The write request unit 340 makes the write request of compressed data outputted into the write buffer 330 for the memory I/F 210 to write the compression data in the write buffer 330 in the shared memory 110 through the memory bus 120

A first measurement unit 320 is provided between the write buffer 330 and the compression unit 310. The first measurement unit 320 measures the amount of compressed data outputted per unit time when the compression unit 310 compresses the frame F2 and outputs the measurement to the control unit 420 mentioned below. The write request unit 350 reads the compressed data of the adjacent frame F1 from the shared memory 110 through the memory bus 110 by presenting a read request to the memory I/F 210 and outputs the same to the read buffer 370. As a result, the decompression unit 380 decompresses the compressed data stored in the read buffer 370 to obtain the adjacent decompressed frame EF1.

A second measurement unit 360 is provided between the read request unit 350 and the read buffer 370. The second measurement unit 360 measures the amount of the compressed data read by the read request unit 350 per unit time and output the same to the control unit 420.

The memory bus monitoring unit 410 monitors from time to time the degree of congestion of the memory bus 120 and outputs the result of monitoring, for example, the use ratio of the memory bus 120.

The control unit 420 has a bandwidth calculation unit 425, and calculates the memory bus bandwidth used by the overdrive processing unit 200 based on the result of measurement by the first measurement unit 320 and the second measurement unit 360 to obtain the calculated bandwidth.

In this mode of carrying out, the bus bandwidth allocation unit 140 allocates the memory bus bandwidth shown by the first threshold value in the whole of the overdrive processing unit 200, and allocates the memory bus bandwidth shown by the second threshold value (the second threshold value<the first threshold value) to the compression unit 310. The memory bus bandwidth allocated to the compression unit 310 is a memory bus bandwidth that the compression unit 310 can use alone while the decomposition unit 380 is denied of access.

The control unit 420 controls the write request unit 340, the read request unit 350, and the compensation unit 390 based on the monitoring result of the memory bus monitoring unit 410, the memory bus bandwidth (the first threshold value and the second threshold value) that the bus bandwidth allocation unit 140 has allocated to the overdrive processing unit 200 and the compression unit 310, the calculated bandwidth that the bandwidth calculation unit 425 has calculated and the register 430 (the details thereof shall be described below).

The question of whether the compensation unit 390 compensates or not is controlled by the control unit 420. The compensation unit 390 may be called a correction unit. If compensation is to be made, then the compensation unit 390 generates an amount of overdrive in the direction of changing the data of the adjacent decompressed frame EF1 to the current frame F2 data, and compensate the frame F2 data by this overdrive amount and output the same to the liquid crystal display unit 440. In the case of making no compensation, the current frame F2 is outputted as it is on the liquid crystal display unit 440.

Various elements described as functional blocks for performing various processing in FIG. 1 can be constituted by, in terms of hardware, processors, memory and other LSI, and can be realized, in terms of software, by programs loaded in the memory. Therefore, those skilled in the art can understand that these functional blocks can be realized only by hardware, only by software or by the combination thereof, and are not limited to any one of them.

Described in details hereinbelow is the overdrive processing unit 200 by focusing attention on the control unit 420 with reference to FIG. 2.

Figure 2:
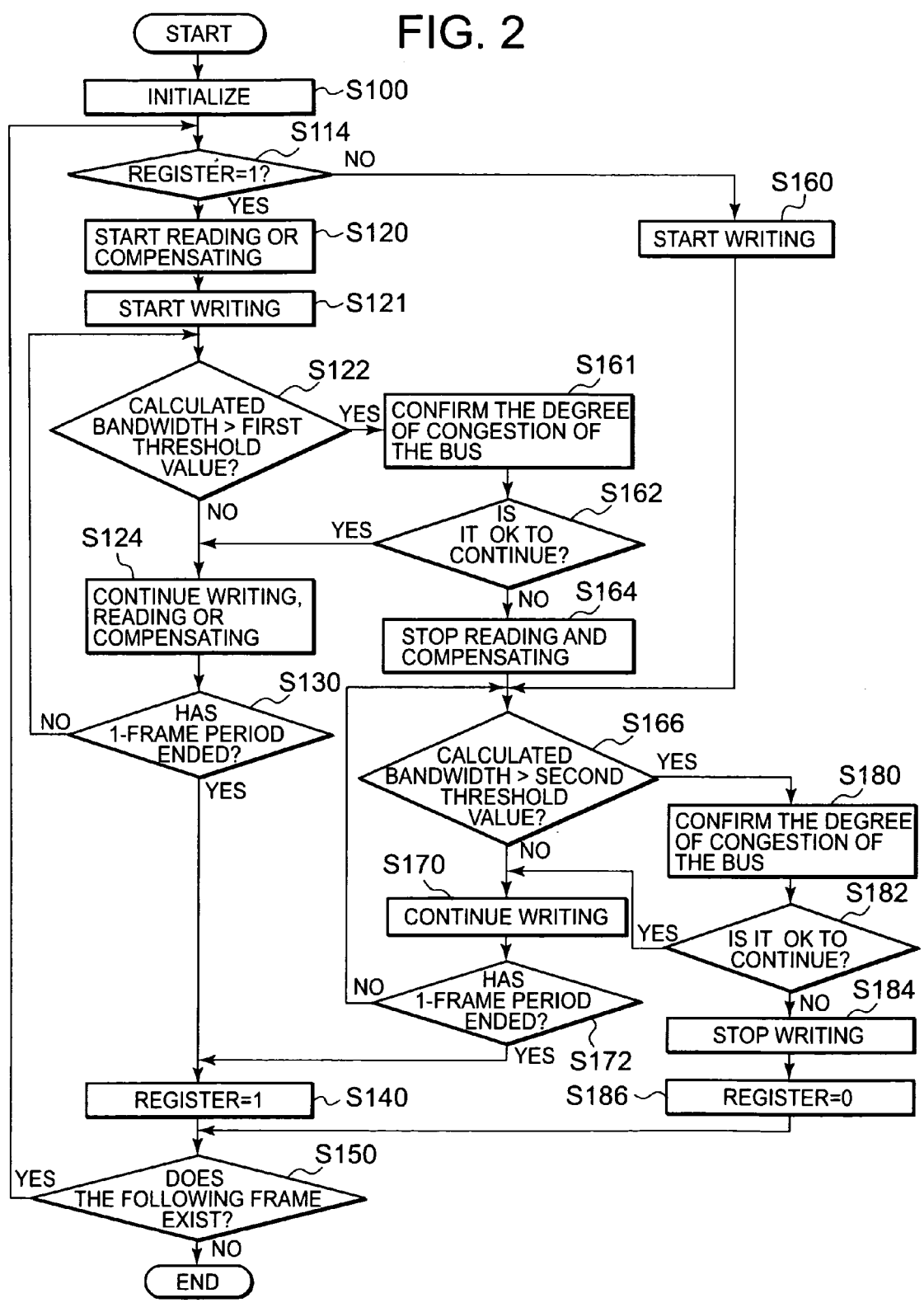
FIG. 2 is a flowchart showing a processing of a control unit in the image processing apparatus shown in FIG. 1.

FIG. 2 is a flowchart showing the flow of processing performed by the control unit 420. When the overdrive processing unit 200 starts operating, the control unit 420 sets the value of the register at zero (0) as one of the initialization processing operations (S100). The register 430 stores the written-state information showing whether the compressed data of the adjacent (previous) frame to be read by the decompression unit 380 has been written in the shared memory or not. In this mode of carrying out, for example, the register 430 is 1 bit, and if the compressed data of the adjacent frame is written in the shared memory 110, it turns out to be "1" and if not written it turns out to be "0." When the overdrive processing unit 200 has started operating, there is no compressed data yet in the shared memory 110, and the default value of the register 430 is "0."

Although no explanation is given particularly below, immediately after the start of operation of the overdrive processing unit 200, the first measurement unit 320 and the second measurement unit 360 always keep operating and outputs the measurements to the control unit 420. The bandwidth calculation unit 425 in the control unit 420 is always calculating the memory bus bandwidth used by the overdrive processing unit 200 based on the measurements of the first measurement unit 320 and the second measurement unit 360. And the memory bus monitoring unit 410 also is always operating, and outputs the use ratio of the memory bus 120 that is the result of monitoring to the control unit 420.

After the initialization, the control unit 420 refers the value of the register 430 (S114). Since the value of the register 430 is "0" that shows that the compression data of the frame adjacent to the current frame is not written in the shared memory 110, the control unit 420 allows the write request unit 340 to write (S114: No, S160). The compression unit 310 compresses the current frame and outputs the compression data to the write buffer 330, and the write request unit 340 starts writing the compressed data from the write buffer 330 to the share memory 110 according to the control of the control unit 420.

The compression unit 310 keeps on compressing the current frame, and the write request unit 340 keeps on writing the compressed data. The control unit 430 compares the calculated bandwidth calculated by the bandwidth calculation unit 425 and the second threshold value, and when the calculated bandwidth is larger than the second threshold value, further refers the monitoring result of the memory bus monitoring unit (S166: Yes, S180). If the calculated bandwidth is outside of the tolerance corresponding to the use ratio of the memory bus 120, the control unit 420 stops the writing of the write request unit 340, and renews the register 430 to "0" showing that the compressed data of the current frame could not be written (S182: No. S184, S186). Here, the register remains at the default value of "0."

On the other hand, if the calculated bandwidth is equal to or smaller than the second threshold value (S166: No), or if the calculated bandwidth is larger than the second threshold value, but is within the tolerance corresponding to the use ratio of the memory bus 120 (S166: Yes, S180, S182: Yes), then the control unit 420 controls the write request unit 340 so that the writing in the shared memory 110 may be continued (S170).

When the processing operations beginning with the step S166 are repeated during one (1) frame period (S172: No, S166 and subsequent steps), and the writing by the write request unit 340 is continued until this frame period is completed, the control unit 420 renews the register 430 to "1" (S172: Yes, S140).

When a frame period is completed, the processing to change the following frame into the current frame starts. (S150: Yes, S114 and subsequent steps). If the register 430 has a value of "0" (in other words, when the writing is suspended in the step S184), the processing will be the same as the one starting with S160 described above, we will omit the description thereof.

On the other hand, if in the step S114 the register 430 has a value "1" showing that the compressed data of the frame adjacent is written in the shared memory 110, then the control unit 420 allows the read request unit 350 to start a reading processing and the compensation unit 390 to start a compensation processing (S114: Yes, S120). Then, the control unit 420 allows the write request unit 340 to start compressing and writing the current frame (S121). Here, the control unit allows to read and then to write because it is possible to write the compressed data of the current frame in the vacant area by reading the compressed data of the adjacent frame, and the compression unit and the decompression unit in the overdrive processing unit 200 can share a memory area.

When the calculated bandwidth is equal to or less than the first threshold value, and the calculated bandwidth is larger than the first threshold value but is within the tolerance corresponding to the use ratio of the memory bus 120 (S122: No, or S122: Yes, S161, S162: Yes), the control unit allows the write request unit 340 to keep on writing, the read request unit 350 to keep on reading, and the compensation unit 390 to keep on compensating (S124). If the write request unit 340 is allowed to keep on writing, the read request unit 350 to keep on reading, and the compensation unit 390 to keep on compensating until one-frame period is completed, the control unit 420 renews the register 430 to "1" (S130: Yes, S140).

On the other hand, when the calculated bandwidth is equal to or larger than the first threshold value and is outside the tolerance corresponding to the use ratio of the memory bus 120 (S122: Yes, S160, S162: No), the control unit 420 stops reading and compensating (S164). With regard to writing corresponding to the processing starting with S166, we omit the description thereof.

When the processing described above is carried out by transforming the last frame into the current frame, the processing of the overdrive processing unit 200 is terminated.

FIG. 3 to FIG. 6 show examples of impacts of changes in the calculated bandwidth during one frame period on the writing of compressed data into the shared memory 110 and the reading of compressed data from the shared memory 110.

Figure 3:
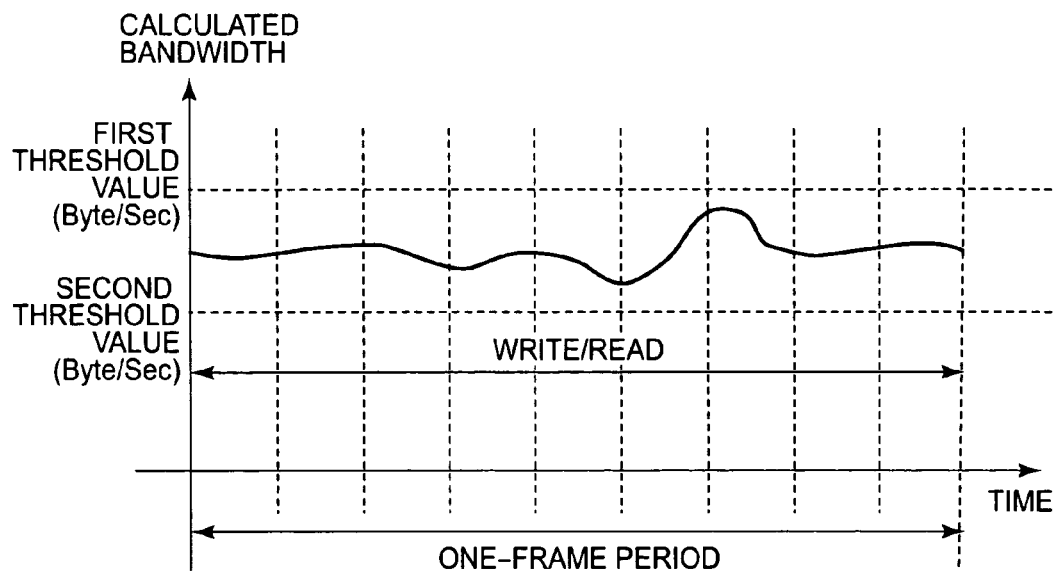
FIG. 3 is an illustration showing an example of processing of an overdrive processing unit in the image processing apparatus shown in FIG. 1.

FIG. 3 shows the case where the calculated bandwidth is equal to or less than the first threshold value during one frame period, and corresponds to the processing during the steps S120-S140 in the flowchart shown in FIG. 2. As this figure shows, in this case, writing and reading (and compensation, ditto hereinafter) continues during one-frame period, and the register 450 is renewed to "1".

Figure 4:
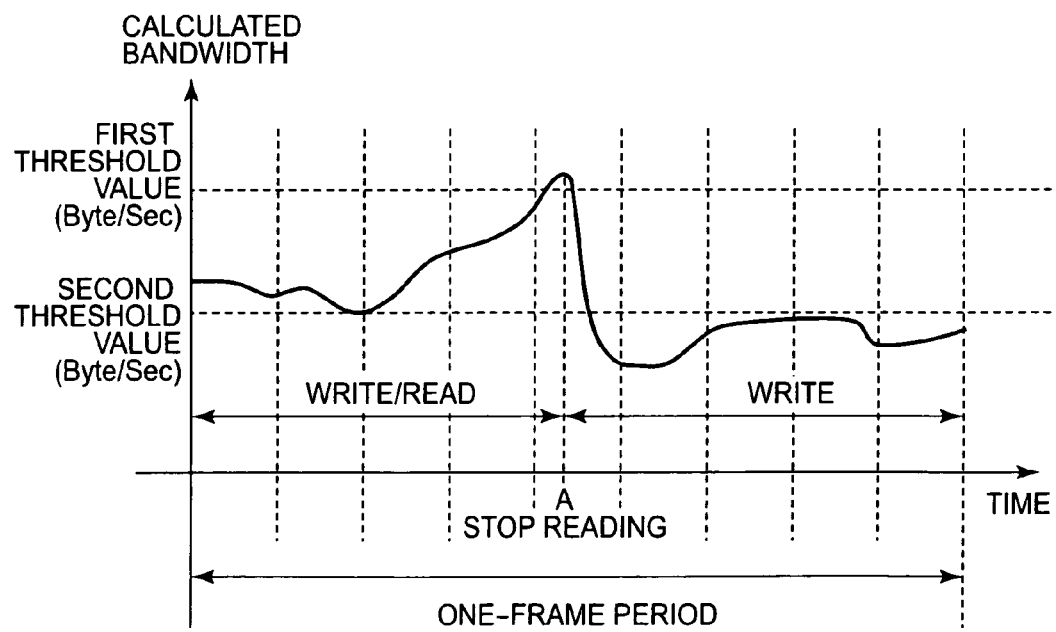
FIG. 4 is an illustration showing an example of processing of the overdrive processing unit in the image processing apparatus shown in FIG. 1.

FIG. 4 shows the case where the calculated bandwidth is larger than the first threshold value and outside the tolerance corresponding to the use ratio of the memory bus 120 in the middle of a one-frame period (timing A in the figure). This example corresponds to the processing in S120, S121, S122: Yes, S161, S162: No, S164 to S172, S140" in the flowchart shown in FIG. 2. As a result of having stopped reading by the timing A, the calculated bandwidth is reduced, remaining below the second threshold value until the frame period is terminated. After the timing A, reading is interrupted, but writing continues until the last moment, and the register 430 is renewed to "1."

Figure 5:
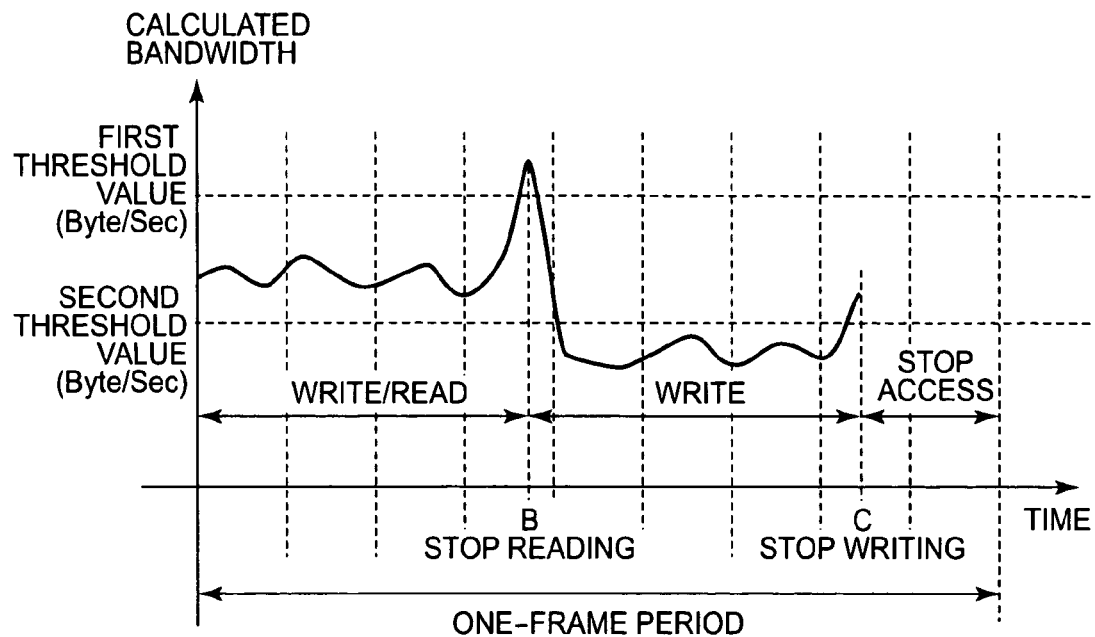
FIG. 5 is an illustration showing an example of processing of the overdrive processing unit in the image processing apparatus shown in FIG. 1.

FIG. 5 shows the case where, at the timing B, the calculated bandwidth is equal to or larger than the first threshold value and outside the tolerance corresponding to the use ratio of the memory bus 120. However, it is different from the case of FIG. 4 in that the compressed data of the current frame could not be written into the shared memory 110. As the figure shows, until the timing C, the calculated bandwidth corresponds to the processing of "S120, S121, S122: Yes, S161, 162: No, S164 to S172" and at the timing B reading was stopped. Thereafter, reading continues because the calculated bandwidth is equal to or less than the second threshold value.

At the timing C, the calculated bandwidth exceeds the second threshold value, and grows out of the tolerance corresponding to the use ratio of the memory bus 120, writing is stopped and the register 430 is renewed to "0." The processing at the timing C corresponds to the processing of "S166: Yes, S180, S182: No, S184 and S186."

Figure 6:
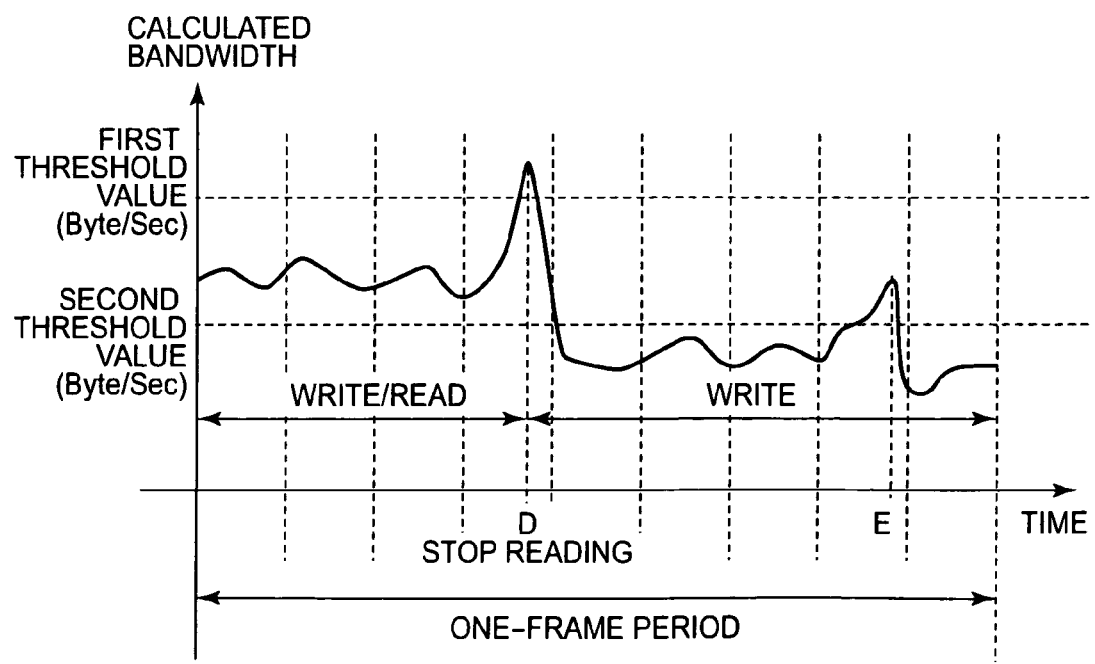
FIG. 6 is an illustration showing an example of processing of the overdrive processing unit in the image processing apparatus shown in FIG. 1.
Figure 7:
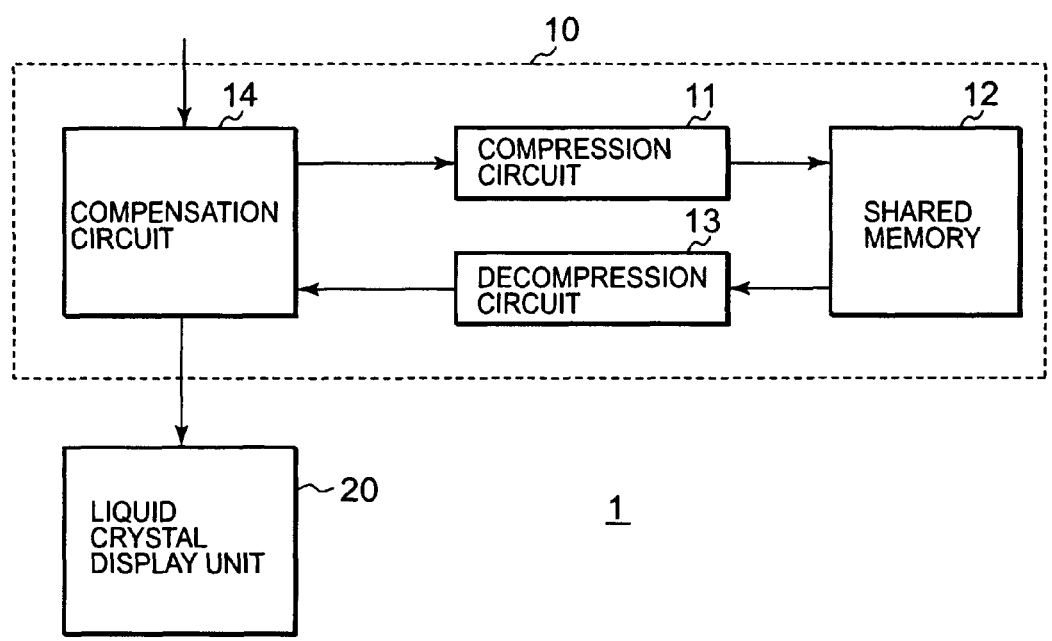
FIG. 7 is an illustration for describing a related art.

According to the example of FIG. 6, up to the timing E, the calculated bandwidth is the same as the one for the timing C shown in FIG. 5. At the timing E, the calculated bandwidth exceeded the second threshold value, but remained within the tolerance corresponding to the use ratio of the memory bus 120 and the writing was not stopped. The processing at the timing E corresponds to the processing of "S166: Yes, S180, S182: Yes, S170" in the flowchart shown in FIG. 2. Then, the writing continues because the calculated bandwidth remained below the second threshold value until the last moment of the frame period, the register 430 is renewed to "1."

Thus, the image processing apparatus 100 of this mode of carrying out calculates the memory bus bandwidth used by the overdrive processing unit 200, and monitors the degree of congestion of the memory bus 120, and controls the access of the overdrive processing unit 200 based on the calculated bandwidth and the degree of congestion. Even if the calculated bandwidth exceeded the bandwidth allocated in advance "the first threshold value," if it remains within the tolerance corresponding to the degree of congestion of the memory bus 120, the overdrive processing unit 200 is allowed to continue accessing, and therefore the vacant memory bus bandwidth can be effectively used and the efficiency of the whole system is assured. In addition, since it is possible to prevent the memory bus breakdown without performing any processing of raising compression ratio in order to reduce the quantity of compressed data as in the case of the conventional art, a good image quality can be maintained.

In the image processing apparatus 100 according to this mode of carrying out, even if the calculated bandwidth has exceeded the first threshold value and is outside of the tolerance corresponding to the degree of congestion of the memory bus 120, only reading is stopped in the first place. If this action leads to a fall of the calculated bandwidth to below the second threshold value, then the writing of compressed data of the current frame can be brought to an end, and the following frame can be compensated. In addition, even if the calculated bandwidth exceeds the second threshold value, if it is within the tolerance corresponding to the degree of congestion of the memory bus 120, then a vacant memory bus can be put to practical use by allowing continued writing and thus a high efficiency can be assured.

If reversible compression is used as a compression algorithm, then the bandwidth to be used changes depending on the frame, and it is therefore considered difficult to calculate the bandwidth used. Since, in this mode of carrying out, the bandwidth is calculated by measuring the amount of compressed data that the compression unit has obtained per unit length of time and the amount of compressed data that the decompression unit reads per unit length of time, even if the reversible compression algorithm is used, the bandwidth used can be calculated with a high precision, and this can prove effective for using effectively the memory bus.

This, the invention has been described based on the mode of carrying out. The mode of carrying out is an example, and as long as no deviation is made from the main purport of this invention, various variations, adjustments or combinations may be made to the mode of carrying out described above. Persons skilled in the art can understand that variants resulting from these variations, adjustments and combinations are within the scope of this invention.

For example, the image processing apparatus 100 allocates memory bus bandwidth over the whole of the overdrive processing unit 200, and if the reading is suspended, bandwidth is allocated only for writing, and two bandwidths (the first threshold value and the second threshold value) are used to control accesses to the shared memory 110. However, only the first threshold value may be used to control whether the access to the whole overdrive processing unit 200 may be allowed to continue. In this case also, it is possible to prevent breakdown of the memory bus while controlling any deterioration in the quality of image by effectively using the memory bus bandwidth by controlling by the combination of the monitoring of memory bus bandwidth and the calculated bandwidth obtained by calculating the bandwidth used by the overdrive processing unit 200.

The position of the bandwidth calculation unit 425 and the register 430 is not limited to the one shown in FIG. 1, and for example the bandwidth calculation unit 425 may be located outside the control unit 420, and the register 430 may be installed within the control unit 420.

The control unit 420 and the bus bandwidth allocation unit 140 are separately fixed in the image processing unit 100, and the bus bandwidth allocation unit 140 sets the first threshold value and the second threshold value. However, it is possible to adopt a variant in which the first threshold value and the second threshold value are allocated by the control unit.

When the calculated bandwidth has exceeded the first threshold value in the image processing apparatus 100, writing and reading are controlled based on the degree of congestion of the memory bus. However, they may be controlled based only on the calculated bandwidth and the degree of congestion without setting the first threshold value. For example, if the calculated bandwidth is within the tolerance corresponding to the degree of congestion, then the overdrive processing unit may be allowed a continued access, and if the calculated bandwidth is outside the tolerance corresponding to the degree of congestion, the overdrive processing unit may be denied of its access.

The image processing unit 100 according to this mode of carrying out is an example of applying the art of frame transfer processing related to this invention to an image display apparatus having an overdrive function. The art of this invention is not limited to this, and may be applied to any apparatus wherein the current frame image is compressed and the compressed data is stored in the shared memory, and the compressed data of the adjacent frame image stored in the shared memory is read and decompressed.

Further, it is noted that, Applicant's intent is to encompass equivalents of all claim elements, even if amended later during prosecution.

What is claimed is:

1. An image processing apparatus comprising:
    a memory bus provided to access a memory;
    a compression unit which compresses an image input and writes a compressed data into said memory thorough said memory bus;
    a decompression unit which reads and decompresses the compressed data of an adjacent image of said image written by said compression unit, from said memory through said memory bus, to obtain a decompressed image of the adjacent image;
    a memory bus monitoring unit which monitors a degree of congestion of said memory bus;
    a bandwidth calculation unit which calculates a memory bus bandwidth used by any of said compression unit and said decompression unit, to obtain a calculated bandwidth; and
    a control unit which controls whether to permit any of said compression unit and said decompression unit to access said memory, based on said calculated bandwidth and the degree of congestion of said memory bus,
    wherein said memory comprises a shared memory and, said compression unit and said decompression unit conduct an access processing to said shared memory in parallel,
    wherein said control unit allows said compression unit and said decompression unit to continue the access processing on a condition that said calculated bandwidth is equal to or less than a first threshold value, and allows said compression unit and said decompression unit to continue the access processing free from adjusting a compression ratio for the compressed data on a condition that said calculated bandwidth is within a tolerance corresponding to said degree of congestion of said memory bus when said calculated bandwidth is greater than said first threshold value, and
    wherein said control unit stops conducting said access processing of said decompression unit whereas said compression unit continues to access said memory and write compressed data into said memory when said calculated bandwidth is greater than said first threshold value and outside said tolerance.

2. The image processing apparatus according to claim 1, further comprising:
    a first measurement unit which measures an amount of compressed data acquired by said compression unit per unit time; and
    a second measurement unit which measures an amount of compressed data read by said decompression unit per unit time,
    wherein said bandwidth calculation unit calculates said calculated bandwidth based on measurement result of said first and second measurement units.

3. The image processing apparatus according to claim 1, further comprising a frame transfer unit, said frame transfer unit comprising said compression unit and said decompression unit, wherein said first threshold value comprises the memory bus bandwidth allocated in advance to said frame transfer unit.

4. The image processing apparatus according to claim 1, wherein said memory comprises;
    a written state information recording unit which records a written state information, which indicates whether said compression unit has regularly completed to write all of the compressed data of said adjacent image into said shared memory,
    wherein said control unit refers said written state information of said adjacent image recorded in said written state information recording unit when said decompression unit started reading the compressed data of said adjacent image, and stops the access processing of said decompression unit when said written state information indicates that the writing has not been regularly completed.

5. The image processing apparatus according to claim 1, wherein:
    when said compression unit conducts the access processing and said decompression unit is denied of conducting the access processing, said control unit allows said compression unit to conduct the access processing on a condition that said calculated bandwidth is equal to or less than a second threshold value which is less than said first threshold value, and allows said compression unit to conduct the access processing on a condition that said calculated bandwidth is greater than said second threshold value and is within the tolerance corresponding to the degree of congestion of said memory bus.

6. The image processing apparatus according to claim 5, wherein said second threshold value comprises the memory bus bandwidth allocated in advance to said compression unit.

7. The image processing apparatus according to claim 1, wherein the image comprises a current frame image and said adjacent image comprises an adjacent frame image, further comprising:
a compensation unit which compensates and outputs said current frame image by using the decompressed image of adjacent frame image,
wherein said control unit controls said compensation unit to output said current frame image without compensating when said decompression unit is denied of conducting said access processing.

8. The image processing apparatus according to claim 7, further comprising a liquid crystal display showing images corresponding to the output of said compensation unit.

9. The image processing apparatus according to claim 1, wherein said control unit further stops conducting access processing of said compression unit when said calculated bandwidth is greater than a second threshold value which is less than said first threshold value and said calculated bandwidth is outside said tolerance.

10. An image processing apparatus comprising:
a memory bus provided to access a memory;
a compression unit configured to compress an image inputted therein to write a compressed data into said memory thorough said memory bus;
a decompression unit configured to read the compressed data of an adjacent image of said image written by said compression unit from said memory through said memory bus, to decompress the adjacent image, and to obtain a decompressed image of the adjacent image;
a memory bus monitoring unit configured to monitor a degree of congestion of said memory bus;
a bandwidth calculation unit configured to calculate a memory bus bandwidth used by at least one of said compression unit and said decompression unit, to obtain a calculated bandwidth; and
a control unit configured to control whether to permit at least one of said compression unit and said decompression unit to access said memory, based on said calculated bandwidth and the degree of congestion of said memory bus,
wherein said control unit allows said compression unit and said decompression unit to continue the access processing free from adjusting a compression ratio for the compressed data on a condition that said calculated bandwidth is within a tolerance corresponding to said degree of congestion of said memory bus when said calculated bandwidth is greater than a predetermined threshold value.

11. The image processing apparatus according to claim 10, wherein the control unit allows said compression unit and said decompression unit to continue the access processing on a condition that said calculated bandwidth is equal to or less than the predetermined threshold value, and
wherein said control unit stops conducting said access processing of said decompression unit whereas said compression unit continues to access said memory and write compressed data into said memory when said calculated bandwidth is greater than the predetermined threshold value and outside said tolerance.

* * * * *